United States Patent
Hannewald

(10) Patent No.: US 7,051,997 B2
(45) Date of Patent: May 30, 2006

(54) VALVE

(75) Inventor: Thomas Hannewald, Griesheim (DE)

(73) Assignee: Siemens AG, München (DE)

( * ) Notice: Subject to any disclaimer, the term of this patent is extended or adjusted under 35 U.S.C. 154(b) by 0 days.

(21) Appl. No.: 11/115,164

(22) Filed: Apr. 27, 2005

(65) Prior Publication Data

US 2005/0199850 A1    Sep. 15, 2005

Related U.S. Application Data

(63) Continuation of application No. PCT/DE03/03261, filed on Sep. 30, 2003.

(30) Foreign Application Priority Data

Nov. 4, 2002    (DE) ............................... 102 51 293

(51) Int. Cl.
     *F16K 25/00*    (2006.01)
(52) U.S. Cl. ........................ 251/368; 251/305
(58) Field of Classification Search ......... 251/305–307
     See application file for complete search history.

(56) References Cited

U.S. PATENT DOCUMENTS

| | | |
|---|---|---|
| 4,010,775 A | 3/1977 | Roberts |
| 4,491,300 A | 1/1985 | Wilson et al. |
| 4,986,246 A | 1/1991 | Kessler de Vivie et al. |
| 5,377,713 A | 1/1995 | Friederich et al. |
| 6,165,272 A | 12/2000 | Liu |
| 6,604,516 B1 | 8/2003 | Krimmer et al. |

| | | |
|---|---|---|
| 2004/0041118 A1 | 3/2004 | Kohlen |

FOREIGN PATENT DOCUMENTS

| | | |
|---|---|---|
| DE | 25 48 778 A1 | 5/1977 |
| DE | 38 39 968 A1 | 5/1990 |
| DE | 38 44 453 C2 | 7/1990 |
| DE | 40 40 436 A1 | 6/1992 |
| DE | 40 40 975 A1 | 6/1992 |
| DE | 198 19 364 A1 | 11/1999 |
| DE | 198 25 860 A1 | 12/1999 |
| DE | 199 34 113 A1 | 1/2001 |
| DE | 10041579 | 3/2002 |
| DE | 10050393 | 4/2002 |
| GB | 732184 | 6/1955 |
| WO | WO 01/50047 A1 | 7/2001 |
| WO | WO02/16750 A1 | 2/2002 |

OTHER PUBLICATIONS

Derwent Abstract—DE-10050393; Throttle valve has throttle plate with annular outer section which is thinner and more rigid than inner section, plate preferably being made from aluminum which is more highly compressed in annular outer section.

(Continued)

*Primary Examiner*—J. Casimer Jacyna
(74) *Attorney, Agent, or Firm*—Siemens AG; J. Eisenberg

(57) ABSTRACT

The present invention relates to a valve which includes a housing made from aluminum and a valve seat made from aluminum, for a flap which is mounted such as to rotate on a drive shaft and a peripheral piston seal. The valve seat includes a metallic coating on the surface thereof facing the flap, the layer thickness of which lies in the range from 5 to 30 m and has a temperature resistance in the range from 500 to 800 Celsius. The invention further relates to a use of said valve.

6 Claims, 1 Drawing Sheet

OTHER PUBLICATIONS

Derwent Abstract—DE-10041579; Valve assembly for the exhaust gas feedback, in a water-cooled IC motor, has a thermal bridge between the mounting flange and the bearing housing for the butterfly valve rod bearing for a low temperature while the motor is running.

Derwent Abstract—DE-38 39 968 A1; May 31, 1990; Audi AG, D-8070 Ingoldstadt (Germany).

Derwent Abstract—DE-198 19 364 A1; Nov. 4, 1999; Robert Bosch GmbH, D-70469 Stuttgart (Germany).

Derwent Abstract—DE-38 44 453 A1; Nov. 28, 1996; Robert Bosch GmbH, D-70469 Stuttgart (Germany).

Derwent Abstract—DE-40 40 975 A1; Jun. 25, 1992; Audi AG, D-8070 Ingoldstadt (Germany).

Derwent Abstract—DE-198 25 860 A1; Dec. 16, 1999; Elgan-Diemantwerkzeuge GmbH & KG, D-72622 Neurtingen (Germany).

Derwent Abstract—DE-40 40 436 A1; Jun. 25, 1992; Simson Fahrzeug GmbH i.L.; D-6000 Suhl (Germany).

Abstract—DE-25 48 778 A1; May 12, 1977; Ewald Hartmann, D-5000 Koeln (Germany).

Derwent Abstract—DE-199 34 113 A1; Jan. 25, 2001; Robert Bosch GmbH, D-70469 Stuttgart (Germany).

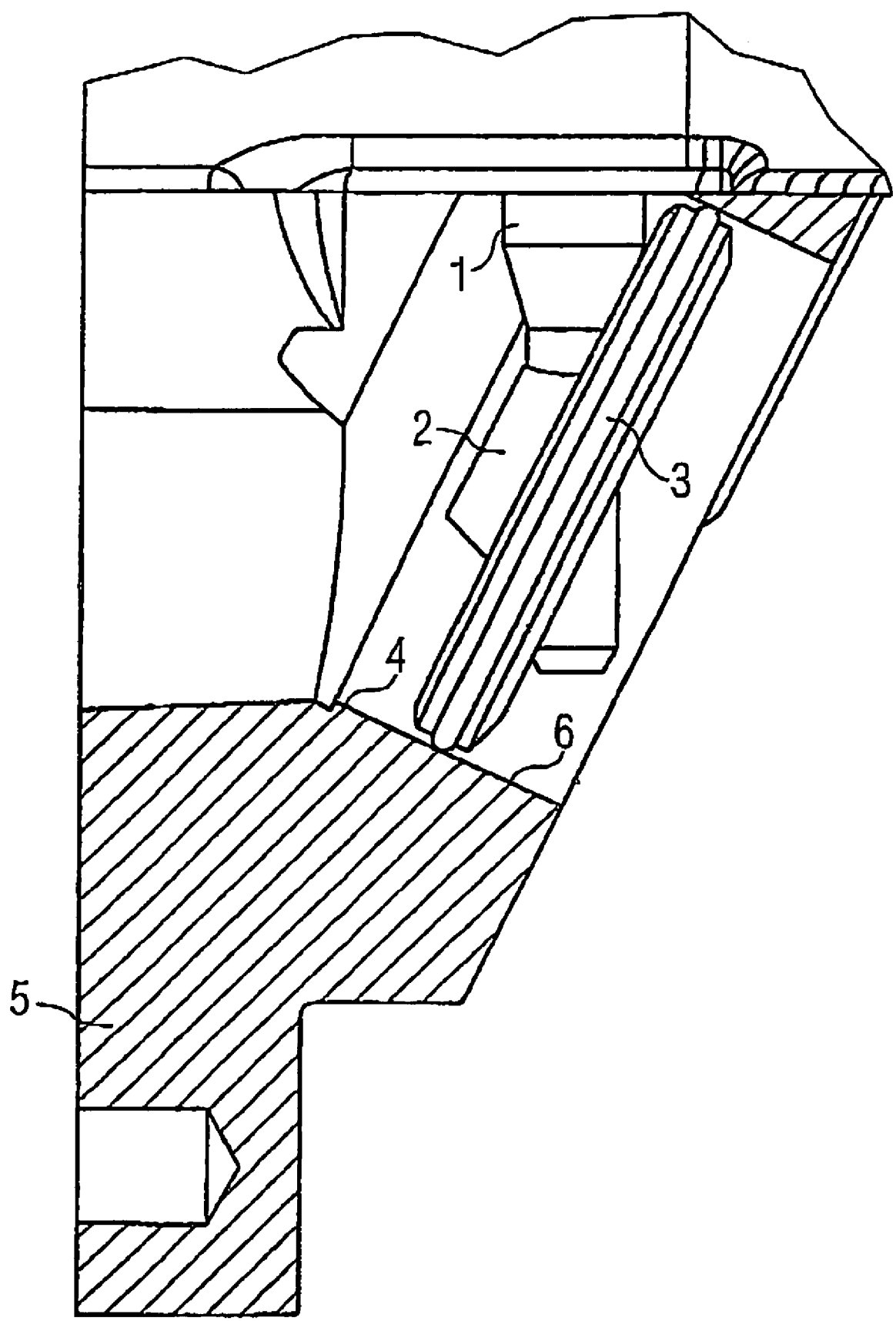

VALVE

CROSS REFERENCE TO RELATED APPLICATIONS

The present application is a continuation of International Application Serial Number PCT/DE03/03261, filed Sep. 30, 2003, which designated the United States and further claims priority to German patent application 10251293.0, filed Nov. 04, 2002, the both of which are herein incorporated by reference.

BACKGROUND OF THE INVENTION

The invention relates to a valve and to the use of the valve. Valves, for example for gas passages, are known. They often consist of an aluminum housing with a valve seat in which a rotatably arranged flap for closing the gas passage is arranged. To avoid leakage air, the valve is in this case provided with a piston seal encircling on the outside. On account of the requisite wear resistance, the valve seat is as a rule produced from steel in a ring shape. If the gases directed via the valve are at temperatures above 400° and if they also fluctuate greatly in their temperature, different expansions occur at the arranged flap and the valve seat, so that a certain annular gap is necessary between the flap and the valve seat during production. The leakage air which occurs as a result during operation can only be reduced in its quantity by very complicated production processes and by small tolerances being set.

SUMMARY OF THE INVENTION

The object of the invention is therefore to provide a valve in which the formation of leakage air can be largely avoided Reliable closing of the gas passage is therefore to be largely ensured even at higher and fluctuating temperatures of the gas.

The object of the invention is achieved by a valve which consists of an aluminum housing with an aluminum valve seat for a flap which is rotatably mounted on a drive shaft and has an encircling piston seal, in which valve the valve seat, on its surface facing the flap, has a metallic coating, the layer thickness of which is within the range of 5 to 30 μm and which has a temperature resistance within the range of 500 to 800° C. The valve seat is made of aluminum and can therefore also be part of the aluminum housing. As a rule, the flap is made of steel. As a rule, the encircling piston seal is likewise a steel ring, which, for reasons of flexibility, has a gap and which is mounted in a groove which runs in an encircling manner in the flap. During the closing of the gas passage by the valve, this steel ring is pressed into the center relative to the flap and then bears directly against the valve seat. It has surprisingly been shown that the formation of leakage air can be virtually completely avoided if the valve seat is made of aluminum and has the metallic coating on its surface facing the flap. In this case, it is especially advantageous that the arrangement of the relatively expensive steel ring as valve seat can be dispensed with. Since the valve seat is made of aluminum, which expands to a greater extent than the steel flap at higher temperatures, the requisite annular gap between the flap and the valve seat can be minimized. The relatively complicated adherence to close tolerances can therefore be advantageously dispensed with during the production.

A preferred configuration of the invention consists in the fact that the layer thickness is within the range of 20 to 25 μm. The quantity of leakage air can again be reduced by this measure.

According to a further preferred configuration of the invention, the metallic coating is made of nickel or a nickel compound. Nickel or nickel compounds can be applied to aluminum surfaces and fixed there in an especially advantageous manner.

A further configuration of the invention consists in the fact that the metallic coating is made of nickel-silicon carbide. Nickel-silicon carbide is commercially available under the name Nikasil. In this case, heat dissipation in the aluminum valve seat is very good and abrasion of the aluminum valve seat is virtually ruled out, since Nikasil has a relatively high degree of hardness.

According to a further preferred configuration of the invention, the metallic coating is made of aluminum oxide. Aluminum oxide can likewise be applied to the aluminum surface of the valve seat in a relatively simple manner.

A further preferred configuration of the invention consists in the fact that the valve seat has an aluminum ring as parent body, which is pressed into the aluminum housing. In this case, it is advantageous that the aluminum ring as parent body can be coated with the metallic coating outside the housing. The coated aluminum ring can then be pressed into the aluminum housing in a relatively simple manner The manufacture of the valve is thus simplified by this measure.

Finally, the subject matter of the invention is also the use of the valve as a gas recirculation valve of a motor vehicle. In gas recirculation valves of conventional type of construction, the high and fluctuating temperatures of the gases directed through the gas recirculation valve often lead to adverse sticking of the flap in the valve, a factor which is avoided in an especially advantageous manner by the use of the valve according to the invention.

BRIEF DESCRIPTION OF THE SEVERAL VIEWS OF THE DRAWINGS

The invention is explained in more detail and by way of example below with reference to the drawing (FIGURE).

The FIGURE shows the valve in cross section.

DETAILED DESCRIPTION OF THE INVENTION

The valve is shown in cross section in the FIGURE. The valve consists of an aluminum housing 5 with an aluminum valve seat 6 for a flap 2 which is rotatably mounted on a drive shaft 1 and has an encircling piston seal 3. On its surface facing the flap 2, the valve seat 6, which here is part of the housing 5, has a metallic coating 4, the layer thickness of which is within the range of 5 to 30 μm and which has a temperature resistance within the range of 500 to 800° C. In this case, it is also possible for the valve seat 6 to have an aluminum ring as parent body (not shown), which is pressed with the metallic coating into the aluminum housing 5. The valve is especially suitable as a gas recirculation valve of a motor vehicle.

The invention claimed is:

1. A valve comprising:
   an aluminum housing with an aluminum valve seat for a flap, the flap being rotatably mounted on a drive shaft and including an encircling piston seal, the valve seat, on its surface facing the flap, includes a metallic coating having a layer thickness within a range of 5 to 30 µm and a temperature resistance within a range of 500 to 800° C.

2. The valve according to claim 1, wherein the layer thickness is within a range of 20 to 25 µm.

3. The valve according to claim 1, wherein the metallic coaxing is at least one of nickel and a nickel compound.

4. The valve according to claim 3, wherein the metallic coating is nickel-silicon carbide.

5. The valve according to claim 1, wherein the metallic coating is aluminum oxide.

6. The valve according to claim 1, wherein the valve seat comprises an aluminum ring which is arranged so as to be pressed into the aluminum housing.

* * * * *